(12) United States Patent
Park et al.

(10) Patent No.: US 9,124,711 B2
(45) Date of Patent: *Sep. 1, 2015

(54) APPARATUS AND METHOD FOR CONTROLLING BUILT-IN MICROPHONE OF PORTABLE TERMINAL

(71) Applicant: Samsung Electronics Co., Ltd., Gyeonggi-do (KR)

(72) Inventors: Sang-Kyu Park, Gyeonggi-do (KR); Seung-Yup Lee, Gyeonggi-do (KR); Jung-Ho Park, Seoul (KR); Soo-Ho Song, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,217

(22) Filed: Oct. 6, 2014

(65) Prior Publication Data

US 2015/0024690 A1   Jan. 22, 2015

Related U.S. Application Data

(63) Continuation of application No. 14/325,848, filed on Jul. 8, 2014, which is a continuation of application No. 12/113,577, filed on May 1, 2008, now Pat. No. 8,774,863.

(30) Foreign Application Priority Data

May 4, 2007   (KR) .................. 10-2007-0043405

(51) Int. Cl.
*H04M 3/00*   (2006.01)
*H04M 1/60*   (2006.01)
(Continued)

(52) U.S. Cl.
CPC .......... *H04M 1/6058* (2013.01); *H04M 1/6016* (2013.01); *H04M 1/6066* (2013.01); *H04M 1/725* (2013.01); *H04W 4/008* (2013.01)

(58) Field of Classification Search
CPC ................... H04R 2201/103; H04R 2201/107; H04M 1/6066; H04M 2250/02; H04M 1/6016; H04M 1/6058; H04M 1/725; H04W 4/008
USPC ........................................................ 455/41.2
See application file for complete search history.

(56) References Cited

U.S. PATENT DOCUMENTS 6,594,366 B1 *   7/2003   Adams ........................... 381/74
2003/0115059 A1   6/2003   Jayaratne
(Continued)

FOREIGN PATENT DOCUMENTS

| JP | 2005109845 | * | 9/2003 |
| KR | 1020050109830 | | 11/2005 |
| KR | 1020070017834 | | 2/2007 |

OTHER PUBLICATIONS

U.S. Office Action dated Nov. 28, 2014 issued in counterpart U.S. Appl. No. 14/325,848.

(Continued)

*Primary Examiner* — Timothy Pham
(74) *Attorney, Agent, or Firm* — The Farrell Law Firm, P.C.

(57) ABSTRACT

An electronic device and a method implemented in the electronic device are provided. The method includes detecting, by a device detector, whether a wired external device coupled to the electronic device and including a wired external speaker further includes a wired external microphone; providing a signal, by the device detector, indicating whether the wired external device includes the wired external microphone; detecting, by a controller, a call establishment; and operating, by the controller, a built-in microphone to receive a voice sound if the signal from the device detector indicates that the wired external device does not include the wired external microphone and providing a voice signal received from a second electronic device to the wired external device so that the wired external speaker outputs the voice signal, wherein the built-in microphone and a built-in speaker of the electronic device are coupled to the controller via a COder-DECoder (CODEC).

37 Claims, 2 Drawing Sheets

(51) Int. Cl.
H04M 1/725 (2006.01)
H04W 4/00 (2009.01)
*H04B 1/38* (2015.01)
*H04M 1/00* (2006.01)
*H01R 3/00* (2006.01)

(56) References Cited

U.S. PATENT DOCUMENTS

| | | |
|---|---|---|
| 2003/0151678 A1 | 8/2003 | Lee et al. |
| 2004/0209647 A1* | 10/2004 | Jeong et al. .................. 455/557 |
| 2004/0266349 A1 | 12/2004 | Wang |
| 2005/0130593 A1* | 6/2005 | Michalak .................... 455/66.1 |
| 2006/0165243 A1* | 7/2006 | Lee ................................ 381/74 |
| 2006/0251277 A1* | 11/2006 | Cho .............................. 381/311 |
| 2007/0037615 A1 | 2/2007 | Glezerman |
| 2008/0164994 A1* | 7/2008 | Johnson et al. ............... 340/533 |
| 2008/0200159 A1* | 8/2008 | Lai ................................ 455/416 |
| 2008/0261524 A1 | 10/2008 | Grushkevich |

OTHER PUBLICATIONS

European Search Report dated May 19, 2015 issued in counterpart application No. 08155054.3-1972.

* cited by examiner

APPARATUS AND METHOD FOR CONTROLLING BUILT-IN MICROPHONE OF PORTABLE TERMINAL

PRIORITY

This application is a Continuation application of U.S. application Ser. No. 14/325,848, which was filed in the U.S. Patent & Trademark Office on Jul. 8, 2014, which was a Continuation application of U.S. application Ser. No. 12/113,577, which was filed in the U.S. Patent & Trademark Office on May 1, 2008, now U.S. Pat. No. 8,774,863 issued on Jul. 8, 2014, which claims priority under 35 U.S.C. §119(a) to a Korean patent application filed in the Korean Intellectual Property Office on May 4, 2007 and assigned Serial No. 2007-43405, the entire contents of each of which are incorporated herein by reference.

BACKGROUND OF THE INVENTION

1. Field of the Invention

The present invention relates to an apparatus and method for controlling a built-in microphone of a portable terminal. More particularly, the present invention relates to an apparatus and method in which a built-in microphone of a portable terminal is controlled such that, when a call connection event occurs for call reception/origination in the portable terminal connected with an earphone without a microphone, an output audio signal is output to the connected earphone and an input audio signal is received through the built-in microphone.

2. Description of the Related Art

Recently, with the rapid development of portable terminals, a mobile phone providing wireless voice call and data exchange is regarded as a necessity of life. Conventional portable terminals have generally been regarded as portable devices providing wireless calls. However, along with technical advances and introduction of the wireless Internet, portable terminals are now used for many purposes in addition to telephone calls or schedule management. For example, images can be captured by using a digital camera included in a portable terminal. Further, the portable terminal provides a variety of functions such as watching a satellite broadcasting program, games, Web surfing using the wireless Internet, watching video, listening to music, e-mail services, and so on.

In particular, a headset may be used to receive services in a public place by using a portable terminal capable of playing back video and music. When launched, the portable terminal generally includes a headset so that a user can receive music and audio services through a speaker included in the headset. In addition, when a call is made by call connection, a call service can be provided by receiving user's voice through a microphone included in the headset.

However, as high-quality sound can be provided with the continued development of the portable terminal, users are generally no longer satisfied with the quality of sound provided through the headset included in the portable terminal. Thus, such a user must additionally purchase a device for outputting high-quality sound according to personal preference.

In general, the output device purchased by the user is an earphone without a microphone. In this case, when a call connection event occurs for call reception/origination in a state that the earphone without the microphone is connected to the conventional portable terminal, in order to make a call, the earphone connected to the portable terminal has to be disconnected. In addition, the user inconveniently has to take off the earphone from his or her ear. That is, to achieve the high-quality sound, the user has to experience inconvenience during a call connection.

SUMMARY OF THE INVENTION

An aspect of the present invention is to address at least the above-mentioned problems and/or disadvantages and to provide at least the advantages described below. Accordingly, an aspect of the present invention is to provide an apparatus and method for controlling a built-in microphone of a portable terminal.

Another aspect of the present invention is to provide an apparatus and method for controlling a built-in microphone of a portable terminal, in which a connection device is checked upon detecting a call connection event and whether to use the built-in microphone is determined according to the connection device.

Another aspect of the present invention is to provide an apparatus and method in which a built-in microphone of a portable terminal is controlled such that, when a call connection event occurs for call reception/origination in the portable terminal connected with an earphone without a microphone, an output audio voice signal is output to the connected earphone and an input audio signal is received through the built-in microphone.

According to an aspect of the present invention, an electronic device is provided. The electronic device includes a built-in microphone; a device detector configured to detect whether a wired external device coupled to the electronic device and including a wired external speaker further includes a wired external microphone, and provide a signal indicating whether the wired external device includes the wired external microphone; and a controller electrically coupled to the device detector, the controller, upon detecting a call establishment, being configured to operate the built-in microphone to receive a voice sound if the signal from the device detector indicates that the wired external device does not include the wired external microphone, and provide a voice signal received from a second electronic device to the wired external device so that the wired external speaker outputs the voice signal, wherein the built-in microphone and the built-in speaker are coupled to the controller via a COder-DECoder (CODEC).

According to another aspect of the present invention, an electronic device is provided. The electronic device includes a built-in microphone; a Bluetooth communication module configured to detect whether a wireless external device including a wireless external speaker further includes a wireless external microphone, and provide a signal indicating whether the wireless external device coupled to the electronic device includes the wireless external microphone; and a controller electrically coupled to the Bluetooth communication module, the controller, upon detecting a call establishment, being configured to operate the built-in microphone to receive a voice sound if the signal from the Bluetooth communication module indicates that the wireless external device does not include the wireless external microphone, and provide a voice signal received from a second electronic device to the wireless external device so that the wireless external device outputs the voice signal via the wireless external speaker included in the wireless external device.

According to another aspect of the present invention, a method implemented in an electronic device is provided. The method includes detecting, by a device detector, whether a wired external device coupled to the electronic device and including a wired external speaker further includes a wired external microphone; providing a signal, by the device detector, indicating whether the wired external device includes the wired external microphone; detecting, by a controller, a call establishment; and operating, by the controller, a built-in microphone to receive a voice sound if the signal from the device detector indicates that the wired external device does not include the wired external microphone and providing a voice signal received from a second electronic device to the wired external device so that the wired external speaker outputs the voice signal, wherein the built-in microphone and a built-in speaker of the electronic device are coupled to the controller via a COder-DECoder (CODEC).

According to another aspect of the present invention, a method implemented in an electronic device is provided. The method includes detecting, by a Bluetooth communication module, whether a wireless external device coupled to the electronic device includes a wireless external microphone; providing a signal, by the Bluetooth communication module, indicating whether the wireless external device coupled to the electronic device includes the wireless external microphone; detecting, by a controller, a call establishment; and operating, by the controller, a built-in microphone to receive a voice sound if the signal from the Bluetooth communication module indicates that the wireless external device does not include the wireless external microphone and providing a voice signal received from a second electronic device to the wireless external device so that the wireless external device outputs the voice signal via the wired external speaker included in the wireless external device.

BRIEF DESCRIPTION OF THE DRAWINGS

The above and other aspects, features and advantages of certain embodiments of the present invention will become more apparent from the following detailed description when taken in conjunction with the accompanying drawings in which.

DETAILED DESCRIPTION OF EMBODIMENTS OF THE PRESENT INVENTION

Embodiments of the present invention will be described below with reference to the accompanying drawings. In the following description, well-known functions or constructions are not described in detail since they would obscure the invention in unnecessary detail.

The present invention relates to an apparatus and method in which a built-in microphone of a portable terminal is controlled such that, when a call connection event occurs for call reception/origination in the portable terminal connected with an earphone without a microphone, an output audio signal is output to the connected earphone and an input audio signal is received through the built-in microphone. The present invention will hereinafter be described with reference to FIG. 1.

In the present invention, an earphone is defined as a device that does not include a microphone and includes a speaker for outputting an output audio signal. A wireless earphone is defined as a device that does not include a microphone and includes a speaker for outputting an output audio signal by being wirelessly connected through a wireless connection method such as Bluetooth®. A headset is defined as a device that includes both a microphone and a speaker. A wireless headset is defined as a device that includes both a microphone and a speaker, each of which transmits/receives an audio signal by being wireless connecting through a wireless connection method such as the Bluetooth. The headset or the wireless headset is also referred to as an ear microphone.

Figure 1:
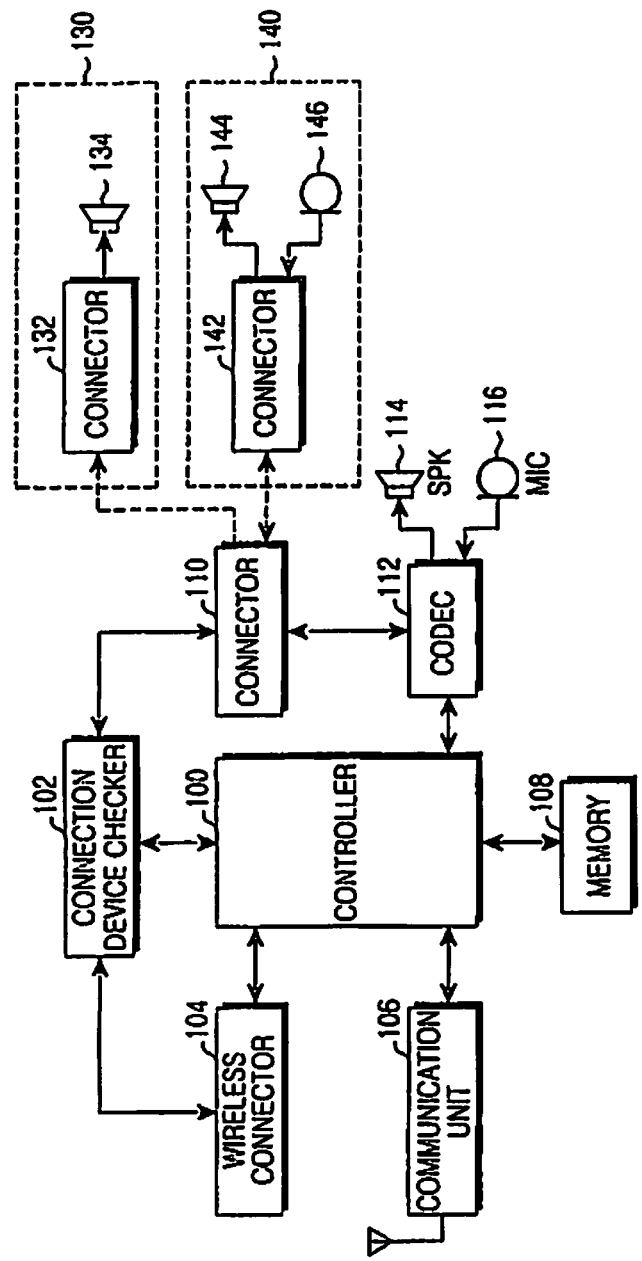
FIG. 1 is a block diagram illustrating a structure of a portable terminal for detecting whether to use a built-in microphone depending on which connection device is used when a call connection event occurs, according to an embodiment of the present invention.

Referring to FIG. 1, the portable terminal of the present invention includes a controller 100, a connection device checker 102, a wireless connector 104, a communication unit 106, a memory 108, a connector 110, a COder-DECoder (CODEC) 112, a built-in speaker 114, and a built-in microphone 116.

The wireless connector 104 wirelessly transmits/receives an audio signal by connecting a wireless device (e.g., wireless earphone or wireless headset) under the control of the controller 100, and provides information on the connected wireless device to the connection device checker 102 at the request of the connection device checker 102. The wireless connector 104 may use a Bluetooth communication technique for wireless connection. When the wireless connector 104 uses the Bluetooth communication technique, a general operation of Bluetooth communication is performed in which a connectable Bluetooth device is searched for under the control of the controller 100 and Bluetooth connection is made by pairing if authentication is required. In the present invention, the wireless connector 104 is optional, and thus may not be provided.

In a receiving operation, the communication unit 106 decreases a frequency of a Radio Frequency (RF) signal received through an antenna, and then performs de-spreading and channel decoding on the received signal. In a transmitting operation, the communication unit 106 performs channel coding and spreading on the received signal, increases the frequency of the received signal, and then transmits the signal through the antenna. In addition, in order to connect a call, the communication unit 106 receives or transmits a call connection request.

The memory 108 stores programs for controlling an overall operation of the portable terminal, application programs, and data (e.g., telephone numbers, Short Message Service (SMS) messages, compressed image files, video, etc.).

Through a wired connection, the connector 110 may be physically connected to a connector 132 of an earphone 130 including only a speaker 134 or may be physically connected to a connector 142 of a headset 140 including both a speaker 144 and a microphone 146. The connector 110 may be composed of one socket that can connect both the earphone 130 and the headset 140. Alternatively, the connector 110 may be composed of a first socket for connecting the earphone 130 and a second socket for connecting the headset 140 so as to be respectively connected to a plurality of devices.

The CODEC 112 connected to the controller 100, the built-in speaker 114 connected to the CODEC 112, and the built-in microphone 116 are provided as an audio input/output block used for a voice call. The CODEC 112 converts Pulse Code Modulation (PCM) data provided from the controller 100 into an analog audio signal and then transmits the analog audio signal to the built-in speaker 114, or transmits the analog audio signal through the earphone 130 and the speaker 144 of the headset 140. In addition, the CODEC 112 converts an input audio signal received through the built-in microphone 116 or through the microphone 146 of the headset 140 into data, and then transmits the data to the controller 100.

At the request of the controller 100, the connection device checker 102 checks the wireless connector 104 so as to determine whether a wireless earphone or a wireless headset is connected. In addition, the connection device checker 102 checks the connector 110 so as to determine whether an earphone or a headset is connected. Then, the connection device checker 102 provides the controller 100 with information on the connected device.

Upon detecting a call connection event when a call connection request is received or transmitted, the controller 100 requests the connection device checker 102 to send information on a connection device currently connected, and receives information on the connection device from the connection device checker 102 and thus selects a device for inputting/outputting an audio signal according to the connection device.

In other words, under the control of the controller 100, upon detecting the call connection event, information on the connection device currently connected is checked through the connection device checker 102, and if the connection device is either an earphone or a wireless earphone, an output audio signal is output to the connected earphone or the wireless earphone, and the input audio signal is received by activating the built-in microphone 116 of the portable terminal. If the information on the connection device is a headset (or wireless headset), audio signal is input/output by activating a speaker and a microphone of the headset (or wireless headset). If no connection device is connected, the audio signal is input/output by activating the built-in speaker 114 and the built-in microphone 116 of the portable terminal. In addition, under the control of the controller 100, when the call connection event occurs, if the connection device information obtained by the connection device checker 102 shows that two or more connection devices are connected, the connection devices for providing services are selected according to a predetermined priority. For example, if the connector 110 has a plurality of connection sockets and detects the call connection event in a state that both an earphone and a headset are connected, then the audio signal is input/output by activating the speaker and microphone of the headset under the control of the controller 100.

Meanwhile, the controller 100 controls the connection device checker 102. That is, the controller 100 may perform a function of the connection device checker 102. The controller 100 and the connection device checker 102 are described as being separately implemented in the present invention for explanation purposes only. Thus, in practice, the connection device checker 102 may be incorporated into the controller 100 or may be provided separately from the controller 100.

Figure 2:
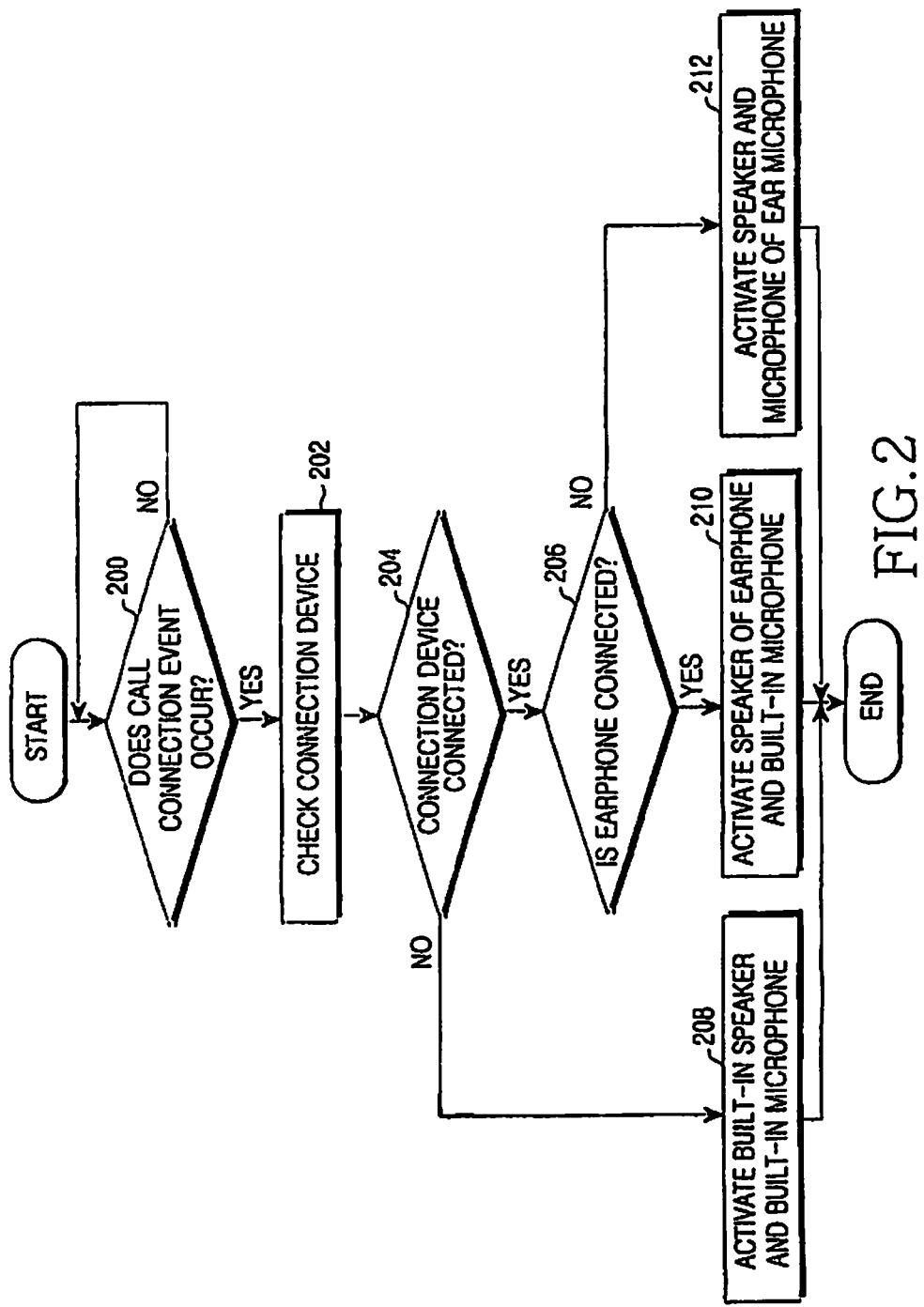
FIG. 2 is a flowchart illustrating a process of determining whether to use a built-in microphone depending on which connection device is used when a call connection event occurs in a portable terminal, according to an embodiment of the present invention.

Now, a method of controlling a microphone of a portable terminal according to the present invention will be described with reference to FIG. 2. FIG. 2 is a flowchart illustrating a process of determining whether to use a built-in microphone depending on which connection device is used when a call connection event occurs in a portable terminal, according to an embodiment of the present invention.

Referring to FIG. 2, upon detecting a call connection event in step 200, information on a connected connection device is checked in step 202.

In step 204, existence of the connection device is determined according to the checking result of step 202. If the determination result of step 204 shows that no connection device is connected, a built-in speaker and a built-in earphone are activated in step 208, so as to input/output an audio signal.

If the determination result of step 204 shows that a connection device is connected, it is determined whether the connected connection device is an earphone in step 206. If the determination result of step 206 shows that the connected connection device is the earphone, a speaker of the earphone and a built-in microphone of the portable terminal are activated in step 210, so that the output audio signal is output through the speaker of the earphone and the input audio signal is received through the built-in microphone.

If the determination result of step 206 shows that the connected connection device is not the earphone but a headset, the speaker and microphone of the headset are activated so that the audio signal is input/output through the ear microphone.

Although it has been described in FIG. 2 that the earphone and the headset are connected, the earphone described in FIG. 2 may be a wireless earphone, and the headset may be a wireless headset.

According to the present invention, an apparatus and method is provided in which a microphone of a portable terminal is controlled such that, when a call connection event occurs for call reception/origination in the portable terminal connected with an earphone without a microphone, an output audio signal is output to the connected earphone and an input audio signal is received through a built-in microphone of the portable terminal. Therefore, a call can be made without having to disconnect the earphone from the portable terminal, thereby providing convenience to users.

While the invention has been shown and described with reference to certain embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. An electronic device capable of coupling to a wireless external device and a wired external device, the electronic device comprising:
    a built-in microphone;
    a Bluetooth communication module configured to wirelessly couple to the wireless external device;
    a device detector configured to:
        detect whether the wired external device, which is coupled to the electronic device and includes a speaker, further includes a microphone, and
        provide a signal indicating whether the wired external device includes the microphone; and
    a controller coupled to the device detector, the controller being configured to:
        detect an establishment of a call through which an incoming voice signal is received,
        if the call establishment is detected while the wired external device is coupled to the electronic device and the wireless external device is not coupled to the electronic device, and if the signal from the device detector indicates that the wired external device does not include the microphone, operate the built-in microphone to receive voice sound and provide the incoming voice signal to the wired external device so that the speaker thereof outputs the voice signal, and
        if the call establishment is detected while both the wired external device and the wireless external device are coupled to the electronic device, select one of the wired external device and the wireless external device and provide the incoming voice signal to the selected one of the wired external device and the wireless external device.

2. The electronic device of claim 1, wherein if the call establishment is detected while a music audio signal is being provided to the wired external device, the controller, after detecting the call establishment, stops providing the music audio signal to the wired external device.

3. The electronic device of claim 1, wherein if the selected one of the wired external device and the wireless external device does not include a microphone, the controller is further configured to operate the built-in microphone to receive voice sound.

4. The electronic device of claim 1, wherein the selection of the one of the wired external device and the wireless external device is performed according to a predetermined priority.

5. The electronic device of claim 1, wherein the call establishment includes accepting a call.

6. The electronic device of claim 1, further comprising a socket,
wherein the device detector is coupled to the socket, and
wherein the device detector detects that the wired external device is coupled to the electronic device when the wired external device is coupled to the socket.

7. The electronic device of claim 1, wherein if the selected one of the wired external device and the wireless external device is the wired external device and if the selected wired external device does not include the microphone, the controller is further configured to operate the built-in microphone to receive voice sound.

8. The electronic device of claim 7, wherein the selection of the one of the wired external device and the wireless external device is performed according to a predetermined priority.

9. The electronic device of claim 8, wherein the call establishment includes accepting a call.

10. The electronic device of claim 1, wherein if the selected one of the wired external device and the wireless external device is the wireless external device and if the selected wireless external device does not include a microphone, the controller is further configured to operate the built-in microphone to receive voice sound.

11. The electronic device of claim 10, wherein the selection of the one of the wired external device and the wireless external device is performed according to a predetermined priority.

12. The electronic device of claim 11, wherein the call establishment includes accepting a call.

13. The electronic device of claim 1, further comprising a built-in speaker, wherein the built-in microphone and the built-in speaker are coupled to the controller via a COder-DECoder (CODEC).

14. An electronic device capable of coupling to a wireless external device and a wired external device, the electronic device, comprising:
a built-in microphone;
a connector coupled to the wired external device;
a Bluetooth communication module configured to:
detect whether the wireless external device, which includes a speaker, further includes a microphone, and
indicate whether the wireless external device coupled to the electronic device includes the microphone; and
a controller coupled to the Bluetooth communication module, the controller being configured to:
detect an establishment of a call through which an incoming voice signal is received,
if the call establishment is detected while the wireless external device is coupled to the electronic device and the wired external device is not coupled to the electronic device, and if the wireless external device does not include the microphone, operate the built-in microphone to receive voice sound, and
if the call establishment is detected while both the wireless external device and the wired external device are coupled to the electronic device, select one of the wireless external device and the wired external device, and provide the incoming voice signal to the selected one of the wireless external device and the wired external device.

15. The electronic device of claim 14, wherein if the call establishment is detected while a music audio signal is being provided to the wireless external device, the controller, after detecting the call establishment, stops providing the music audio signal to the wireless external device.

16. The electronic device of claim 14, wherein the call establishment includes accepting a call.

17. The electronic device of claim 14, wherein if the selected one of the wireless external device and the wired external device does not include a microphone, the controller is further configured to operate the built-in microphone to receive voice sound.

18. The electronic device of claim 14, wherein the selection of the one of the wireless external device and the wired external device is performed according to a predetermined priority.

19. The electronic device of claim 14, wherein if the selected one of the wired external device and the wireless external device is the wired external device and if the selected wired external device does not include a microphone, the controller is further configured to operate the built-in microphone to receive voice sound.

20. The electronic device of claim 19, wherein the selection of the one of the wired external device and the wireless external device is performed according to a predetermined priority.

21. The electronic device of claim 20, wherein the call establishment includes accepting a call.

22. The electronic device of claim 14, wherein if the selected one of the wired external device and the wireless external device is the wireless external device and if the selected wireless external device does not include the microphone, the controller is further configured to operate the built-in microphone to receive voice sound.

23. The electronic device of claim 22, wherein the selection of the one of the wired external device and the wireless external device is performed according to a predetermined priority.

24. The electronic device of claim 23, wherein the call establishment includes accepting a call.

25. A method implemented in an electronic device capable of coupling to a wireless external device and a wired external device, the method comprising:
detecting, by a device detector, whether the wired external device, which is coupled to the electronic device and includes a speaker, further includes a microphone;
providing a signal, by the device detector, indicating whether the wired external device includes the microphone;
detecting, by a controller, an establishment of a call through which an incoming voice signal is received;
operating, by the controller, if the call establishment is detected while the wired external device is coupled to the electronic device and the wireless external device is not coupled to the electronic device, and if the signal from the device detector indicates that the wires external device does not include the microphone, a built-in microphone to receive voice sound, and providing the incoming voice signal to the wired external device so that the speaker of the wired external device outputs the voice signal; and selecting, by the controller, if the call establishment is detected while the wired external device and a wireless external device are coupled to the electronic device, one of the wired external device and the wireless external device, and providing the incoming voice signal to the selected one of the wired external device and the wireless external device.

26. The method of claim 25, wherein detecting the call establishment by the controller is performed while a music audio signal is being provided to the wired external device and the controller, after detecting the call establishment, stops providing the music audio signal to the wired external device.

27. The method of claim 25, further comprising providing an audio signal to a wireless external device wirelessly coupled to the electronic device via a Bluetooth connection.

28. The method of claim 25, wherein the call establishment includes accepting a call.

29. The method of claim 25, wherein, if the selected one of the wired external device and the wireless external device does not include a microphone, the method further comprises operating the built-in microphone to receive voice sound.

30. The method of claim 25, wherein the selection of the one of the wired external device and the wireless external device is performed according to a predetermined priority.

31. The method of claim 25, wherein the built-in microphone and a built-in speaker are coupled to the controller via a COder-DECoder (CODEC).

32. A method implemented in an electronic device capable of coupling to a wireless external device and a wired external device, the method, comprising:

detecting, by a Bluetooth communication module, whether the wireless external device, which is coupled to the electronic device includes a microphone;

providing a signal, by the Bluetooth communication module, indicating whether the wireless external device coupled to the electronic device includes the microphone;

detecting, by a controller, an establishment of a call through which an incoming voice signal is received;

operating, by the controller, if the call establishment is detected while the wireless external device is coupled to the electronic device and the wired external device is not coupled to the electronic device, and if the signal from the Bluetooth communication module indicates that the wireless external device does not include the microphone, a built-in microphone to receive voice sound; and selecting, by the controller, if the call establishment is detected while the wireless external device and the wired external device are coupled to the electronic device, one of the wireless external device and the wired external device, and providing the incoming voice signal to the selected one of the wired external device and the wireless external device.

33. The method of claim 32, wherein detecting the call establishment by the controller is performed while a music audio signal is being provided to the wireless external device and the controller, after detecting the call establishment, stops providing the music audio signal to the wireless external device.

34. The method of claim 32, further comprising providing the audio signal to the wired external device.

35. The method of claim 32, wherein the call establishment includes accepting a call.

36. The method of claim 32, wherein, if the selected one of the wireless external device and the wired external device does not include a microphone, the method further comprises operating the built-in microphone to receive voice sound.

37. The method of claim 32, wherein the selection of the one of the wireless external device and the wired external device is performed according to a predetermined priority.

* * * * *